(12) United States Patent
Kim et al.

(10) Patent No.: US 10,376,850 B2
(45) Date of Patent: Aug. 13, 2019

(54) UREA SOLUTION INJECTION DEVICE INTEGRATED WITH MIXER

(71) Applicant: HYUNDAI KEFICO CORPORATION, Gunpo, Gyeonggi-do (KR)

(72) Inventors: Hyung Ik Kim, Seoul (KR); Dong Hyun Kim, Gyeonggi-do (KR); Se Hun Kim, Gyeonggi-do (KR)

(73) Assignee: HYUNDAI KEFICO CORPORATION, Gunpo, Gyeonggi-do (KR)

( * ) Notice: Subject to any disclaimer, the term of this patent is extended or adjusted under 35 U.S.C. 154(b) by 86 days.

(21) Appl. No.: 15/629,217

(22) Filed: Jun. 21, 2017

(65) Prior Publication Data

US 2017/0361287 A1   Dec. 21, 2017

(30) Foreign Application Priority Data

Jun. 21, 2016   (KR) .................. 10-2016-0077439

(51) Int. Cl.
*B01F 5/04*  (2006.01)
*F01N 3/20*  (2006.01)
(Continued)

(52) U.S. Cl.
CPC ........ *B01F 5/0473* (2013.01); *B01F 3/04028* (2013.01); *B01F 5/0491* (2013.01);
(Continued)

(58) Field of Classification Search
CPC .... F01N 3/2066; F01N 3/2073; F01N 3/2892; F01N 2240/40; F01N 2450/16;
(Continued)

(56) References Cited

U.S. PATENT DOCUMENTS 8,240,137 B2 * 8/2012 Liu ................. F01N 3/2066
239/433
8,756,921 B2 * 6/2014 Troxler .............. F01N 3/2066
60/295

(Continued)

FOREIGN PATENT DOCUMENTS

JP         4568306 B2   10/2010
KR  10 0904217 B1    6/2009
(Continued)

*Primary Examiner* — Audrey K Bradley
(74) *Attorney, Agent, or Firm* — Mintz Levin Cohn Ferris Glovsky and Popeo, P.C.; Kongsik Kim; Jhongwoo Jay Peck

(57) ABSTRACT

A urea solution injection device includes an exhaust pipe for discharging exhaust gas generated in a combustion chamber to the exterior; an injector is installed and pierces into the exhaust pipe to inject urea solution into the exhaust gas flowing in the exhaust pipe. A catalyst is disposed at a position after the injector when viewed in a flow direction of the exhaust gas and the exhaust gas is discharged to the exterior to decompose the exhaust gas mixed with the urea solution. A urea solution mixer is provided at an end of the injector and installed and pierces into the exhaust pipe. Accordingly the urea solution injected from the injector is dispersed therein. An installation unit provides for the urea solution mixer to be installed in the exhaust pipe and pierces into the exhaust pipe.

4 Claims, 7 Drawing Sheets

(51) Int. Cl.
*B05B 1/34* (2006.01)
*F01N 3/28* (2006.01)
*B01F 3/04* (2006.01)
*B05B 7/00* (2006.01)

(52) U.S. Cl.
CPC ......... *F01N 3/2066* (2013.01); *F01N 3/2073* (2013.01); *F01N 3/2892* (2013.01); *B05B 1/3405* (2013.01); *B05B 7/0075* (2013.01); F01N 2240/40 (2013.01); F01N 2450/16 (2013.01); F01N 2610/102 (2013.01); F01N 2610/1453 (2013.01); Y02T 10/24 (2013.01)

(58) Field of Classification Search
CPC ......... F01N 2610/02; F01N 2610/1453; B01F 3/04028; B01F 5/0473; B01F 5/0491
See application file for complete search history.

(56) References Cited

U.S. PATENT DOCUMENTS

2011/0094206 A1    4/2011  Liu et al.
2015/0071825 A1\*  3/2015  Sampath ............... B01F 5/0451
                                                           422/168

FOREIGN PATENT DOCUMENTS

KR    10-2015-0030250 A    3/2015
WO    WO-2015/074926 A1    5/2015

\* cited by examiner

Related Art

UREA SOLUTION INJECTION DEVICE INTEGRATED WITH MIXER

CROSS-REFERENCE TO RELATED APPLICATION

This application claims priority to Korean Application No. 10-2016-0077439 filed on Jun. 21, 2016, which is incorporated herein by reference.

TECHNICAL FIELD

The present invention relates to a urea solution injection device, and more particularly, to a urea solution injection device having a urea solution mixer disposed at a lower end that disperses urea solution injected into exhaust gas from an injector to reduce nitrogen oxides.

RELATED ART

Recently, exhaust gas regulations have become more stringent and various measures for reducing nitrogen oxides (NOx) which are harmful substance emitted from diesel or gasoline vehicles have been continuously studied in an effort to reduce the environmental impact. Urea-selective catalytic reduction (Urea-SCR) technology is an efficient ways to reduce nitrogen oxides. For example, an SCR reactor having a catalyst installed therein is disposed in a system upstream of an exhaust pipe and an injector for spraying urea solution into the exhaust pipe is installed at one side of the SCR reactor. This injector is coupled to a tank that stores and supplies the urea solution.

When the urea solution is injected into the exhaust gas directed toward the SCR reactor from an engine by the injector, the sprayed urea solution particles are mixed with the exhaust gas and then enter the SCR reactor and pass through the catalyst. While the sprayed urea solution passes through the catalyst, ammonia hydrolyzed from the urea solution reacts with the exhaust gas. Accordingly, the nitrogen oxides in the exhaust gas are reduced to harmless nitrogen and water vapor and then released to the atmosphere. Nitrogen oxides which are harmful substance are purified harmlessly through such a process.

An exemplary embodiment of a conventional structure of an injector that injects urea solution is shown in FIG. 1. As shown, the conventional urea solution injection device includes an exhaust pipe 11 disposed after an exhaust manifold to discharge exhaust gas generated when fuel is burned in a combustion chamber of an engine to the exterior, an injector 12 installed through the exhaust pipe 11 to inject urea solution into the exhaust gas being discharged and a reduction catalyst 13 for decomposing the exhaust gas mixed with the urea solution inside the exhaust pipe 11. A urea solution mixer 14 is disposed between the reduction catalyst 13 and the injector 12 to uniformly mix the urea solution injected from the injector 12 with the exhaust gas and allow the mixture to transfer to the reduction catalyst 13.

The injector 12 is installed at an intermediate portion of the exhaust pipe 11, pierces into the exhaust pipe and is configured having a portion that injects the urea solution positioned within the interior of the exhaust pipe 11 and a portion coupled to a tank containing the urea solution positioned external to the exhaust pipe 11. The reduction catalyst (SCR) 13 is provided within the interior of the exhaust pipe 11 at the rear side of the injector 12 in a direction in which the exhaust gas is exhausted and removes NOx from the exhaust gas mixed with the urea solution injected from the injector 12. The urea solution mixer 14 is coupled around an interior peripheral surface of the exhaust pipe 11 and uniformly mixes the urea solution injected from the injector 12 with the exhaust gas when the exhaust gas flows in the exhaust pipe 11 and is discharged to the exterior.

In the conventional urea solution injection module as described above, when the urea solution mixer 14 that uniformly mixes the urea solution with the exhaust gas is installed in the form obstructing the exhaust pipe 11 that the exhaust gas passes through, generates back pressure in the exhaust pipe 11 when the exhaust gas is discharged. Further, replacement of the urea solution mixer 14 when flow of the exhaust gas is poor due to foreign substance or the like obstructing the urea solution mixer is difficult. For example, when the urea solution mixer 14 is coupled to the interior peripheral surface of the exhaust pipe hand replacement of the urea solution mixer with new one is difficult.

The above information disclosed in this section is merely for enhancement of understanding of the background of the disclosure and therefore it may contain information that does not form the prior art that is already known in this country to a person of ordinary skill in the art.

SUMMARY

The present disclosure provide a urea solution injection device capable of reducing back pressure generated when exhaust gas is discharged by altering the position of a mixer for uniformly mixing urea solution injected from an injector with the exhaust gas. For example, the urea solution injected from the injector is uniformly dispersed by the mixer and uniformly mixed with the exhaust gas discharged along an exhaust pipe.

In an exemplary embodiment of the present disclosure, a urea solution injection device may include an exhaust pipe for discharging exhaust gas generated in a combustion chamber to an exterior; an injector disposed in the exhaust pipe and pierces into the exhaust pipe to inject urea solution into the exhaust gas flowing in the exhaust pipe; a catalyst disposed at a position after the injector when viewed in a flow direction of the exhaust gas, from which the exhaust gas is discharged to the exterior, to decompose the exhaust gas mixed with the urea solution; a urea solution mixer provided at a first end of the injector and disposed within the exhaust pipe and pierces the exhaust pipe to disperse the urea solution injected; and an installation unit that disposes the urea solution mixer within the exhaust pipe in a and pierces into the exhaust pipe.

Further, the urea solution mixer may include a connection member formed in a pipe shape, of having opens ends and a first end is inserted around an exterior peripheral surface of a lower end of the injector, and a mixer member is coupled to a second end of the connection member to disperse the urea solution injected from the injector.

The mixer member may include a ring member inserted around and coupled onto an edge of an opening at the second end of the connection member and having a aperture formed at a center thereof, and a urea solution dispersion member having a plurality of fin members. Each of the fin members may be arranged to form a fan shape with its adjacent fin member having a first end of the fin members coupled to the center of the aperture and a second end of the fin members spaced apart from each other at an interval of a predetermined angle and coupled to the edge of the aperture with a plurality of dispersion apertures that disperse the urea solution. Further, the urea solution dispersion member may include the plurality of fin members formed in a curved shape.

In some exemplary embodiments, the urea solution mixer may include a urea solution guide member coupled to an interior of the connection member and may be provided from the urea solution injection portion of the injector to the ring member of the mixer member to guide the urea solution injected from the injector to the urea solution dispersion member. An inner peripheral surface of the urea solution guide member may be formed with a groove or a projection-shaped spiral portion for guiding the urea solution injected from the injector in a shape of swirl.

Further, the installation unit may include a first engagement portion formed on an exterior peripheral surface of the urea solution mixer to allow the urea solution mixer coupled to the end of the injector to be installed in the exhaust pipe and to pierce into the exhaust pipe, a support protrusion configured to protrude from an exterior peripheral surface of the exhaust pipe to communicate with an interior of the exhaust pipe, and a second engagement portion provided on an interior peripheral surface of the support protrusion to engage with the first engagement portion of the urea solution mixer. Further, the first engagement portion and the second engagement portion may include threads that are screwed to each other.

Further, the installation unit may include a mixer stopper for stopping a lower end of the urea solution mixer to prevent the lower end of the urea solution mixer from being inserted beyond a predetermined depth when the urea solution mixer is installed in the exhaust pipe by screwing the urea solution mixer to the support protrusion. Further, the mixer stopper may be formed to protrude from the interior periphery of the support protrusion, into which the lower end of the urea solution mixer may be fitted, toward a center of the inner periphery of the support protrusion and may be formed as a ring-shaped projection along a circumference of the inner peripheral surface of the support protrusion. Further, the urea solution injection device may include a support protrusion formed to protrude from an exterior peripheral surface of the exhaust pipe and communicate with an interior of the exhaust pipe and a clamp for pressing an exterior peripheral surface of the support protrusion after a lower end of the urea solution mixer is fitted into an interior peripheral surface of the support protrusion.

In an exemplary embodiment of the present disclosure, the back pressure may be reduced by making flow of exhaust gas smooth through coupling to an injector a urea solution mixer. Accordingly, the urea solution may be dispersed into the exhaust gas flowing in an exhaust pipe and may allow the urea solution to be uniformly mixed with the exhaust gas.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
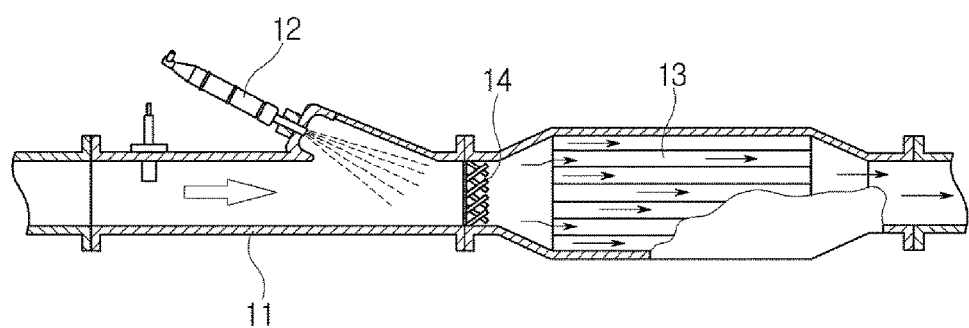
FIG. 1 is an exemplary cross-sectional view showing an exhaust structure in which a conventional urea solution injection module is installed.

Exemplary embodiments of the present disclosure will be described below in more detail with reference to the accompanying drawings. The present disclosure may, however, be embodied in different forms and should not be construed as limited to the exemplary embodiments set forth herein. In describing the exemplary embodiments, thicknesses of lines and dimension of components shown in the drawings may be expressed exaggeratedly for clarity and convenience of description. In addition, terms to be described below are those defined in consideration of functions in the present disclosure, which may vary depending on intention or custom of users or operators. Therefore, definition of these terms should be made based on the contents throughout this specification.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Figure 2:
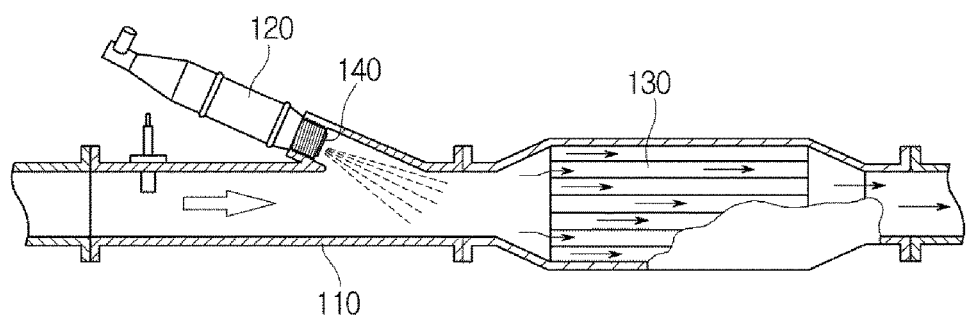
FIG. 2 is an exemplary cross-sectional view showing an exhaust structure in which a urea solution injection device according to an exemplary embodiment of the present disclosure is installed.
Figure 3:
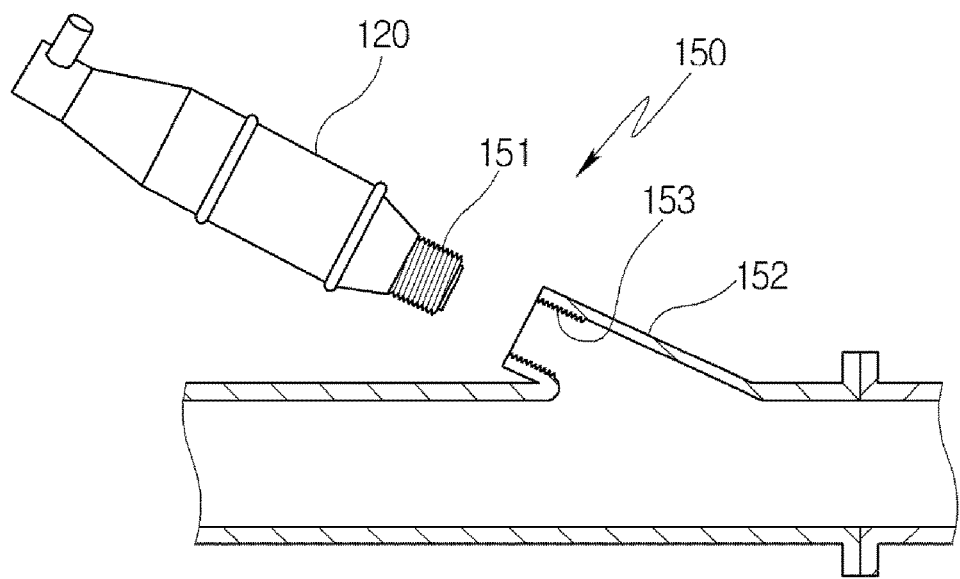
FIG. 3 is an exemplary cross-sectional view showing a state in which a urea solution mixer provided at an injector in the urea solution injection device of FIG. 2 is detached from the exhaust pipe according to an exemplary embodiment of the present disclosure.
Figure 4:
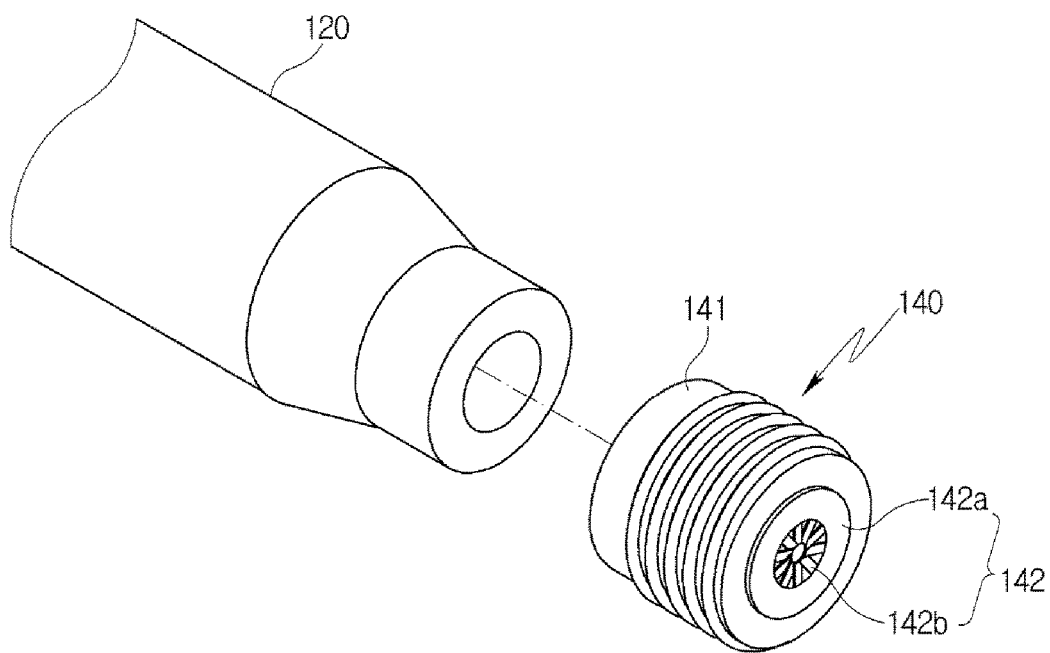
FIG. 4 is an exemplary perspective view showing a state in which the urea solution mixer in the urea solution injection device of FIG. 2 is detached from the injector according to an exemplary embodiment of the present disclosure.
Figure 5:
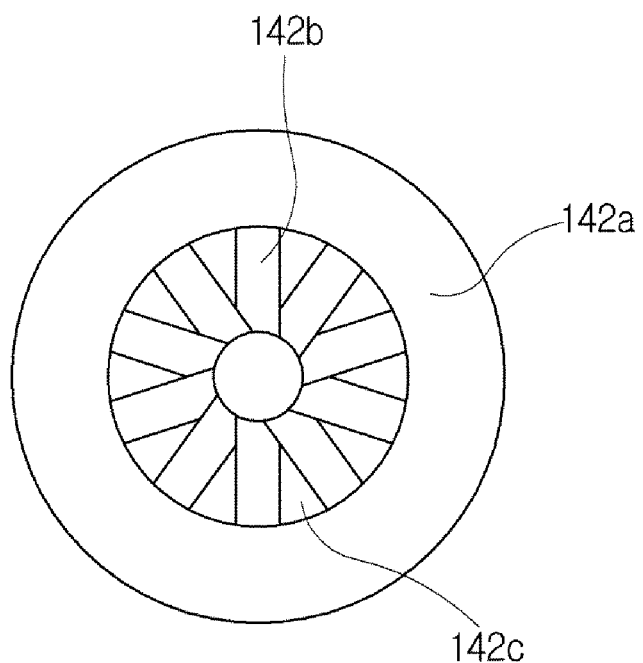
FIG. 5 is an exemplary plan view showing a mixer member of the urea solution mixer in the urea solution injection device of FIG. 2 according to an exemplary embodiment of the present disclosure.

FIG. 2 is an exemplary cross-sectional view showing an exhaust structure in which a urea solution injection device according to an exemplary embodiment of the present disclosure is installed. FIG. 3 is an exemplary cross-sectional view showing a state in which a urea solution mixer provided at an injector in the urea solution injection device of FIG. 2 is detached from the exhaust pipe. FIG. 4 is an exemplary perspective view showing a state in which the urea solution mixer in the urea solution injection device of FIG. 2 is detached from the injector. FIG. 5 is an exemplary plan view showing a mixer member of the urea solution mixer in the urea solution injection device of FIG. 2.

As shown, a coupling structure of a urea solution injection device according to an exemplary embodiment of the present disclosure may include an exhaust pipe 110 for discharging exhaust gas generated when fuel is burned in a combustion chamber of an engine to the exterior; an injector 120 installed in the exhaust pipe 110 and pierces into the exhaust pipe to inject urea solution into the exhaust gas flowing in the exhaust pipe 110; a catalyst 130 disposed at a position after the injector 120 when viewed in a flow direction of the exhaust gas to decompose the exhaust gas mixed with the urea solution injected from the injector 120; a urea solution mixer 140 provided at an end of the injector 120, from which the urea solution is injected, and installed in the exhaust pipe 110 and pierces and protrudes into the exhaust pipe 110; and an installation unit 150 for allowing the urea solution mixer 140 to be installed at the end of the injector 120 and thus in the exhaust pipe 110.

The exhaust pipe 110 may discharge the exhaust gas generated when fuel is burned in a combustion chamber of an engine to the exterior and may be arranged generally from an exhaust manifold provided at the engine to the rear of a vehicle. The injector 120 may receive urea solution from a urea solution tank (not shown) installed separately at the exterior and inject the urea solution into the exhaust gas flowing in the exhaust pipe 110. The injector may be installed in the exhaust pipe 110 and may pierce into the exhaust pipe and protrude from the exterior of the exhaust pipe 110 into the interior of the exhaust pipe 110.

The injector 120 may include an injector body of having a first end formed with a urea solution connector coupled to the urea solution tank. The second end may be formed with an injection portion that the urea solution is injected from. A housing may be provided to cover the exterior peripheral surface of the injector body in a manner of being spaced apart from the exterior peripheral surface of the injector body. The urea solution mixer 140 may be coupled to the injector 120 to disperse the urea solution when the urea solution is injected from the injection portion of the injector 120 to the exhaust gas flowing in the exhaust pipe and may include a connection member 141 and a mixer member 142.

The connection member 141 may allow the mixer member 142 to be described later to engage with the lower end of the injector 120, from which the urea solution is injected, and may be formed in a cylindrical shape that have the upper and lower portions pierced. In other words, the open upper portion of the connection member 141 may be inserted around and engaged with the exterior peripheral surface of the lower end of the housing of the injector 120.

In particular, the interior peripheral surface of a first end of the connection member 141 may be formed with a thread and the exterior peripheral surface of the lower end of the housing of the injector 120 may be formed with a corresponding thread so that when the connection member 141 is engaged with the exterior peripheral surface of the lower end of the housing, the connection member is screwed to the exterior peripheral surface of the housing. The opening a first end of the connection member 141 may be inserted around the exterior peripheral surface of the housing of the injector 120 and then the top end of the second end of the connection member 141 and the exterior peripheral surface of the housing of the injector 120 are welded to each other and fixed.

The mixer member 142 may disperse the urea solution injected from the injector 120 into the exhaust gas flowing in the exhaust pipe 110. The mixer member may be formed in a circular shape and coupled to the open lower portion of the connection member 141. The mixer member 142 may include a ring member 142a formed in a circular shape to be fitted into and fixed to an edge of the lower opening of the connection member 141 and having an aperture at the center thereof, and a urea solution dispersion member 142b having a plurality of dispersion apertures 142c formed to disperse the urea solution by arranging a plurality of fin members in a fan shape to cover the apertures.

In particular, the urea solution dispersion member 142b may be configured to have a structure in which the plurality of fin members are coupled to each other at their respective first ends as their center and the second ends of the plurality of fin members are spaced apart from each other with an interval of a predetermined angle. Accordingly, a circular shape like a series of spokes of an umbrella may be formed and a triangular-shaped dispersion aperture 142c may be formed respectively between two adjacent fin members. In other words, each of the dispersion apertures 142c may be formed in a triangular shape. The central portion of the aperture may be a vertex of the dispersion apertures 142c whereas a portion corresponding to the interior peripheral surface of the aperture constitutes a base of the dispersion apertures 142c.

Figure 6:
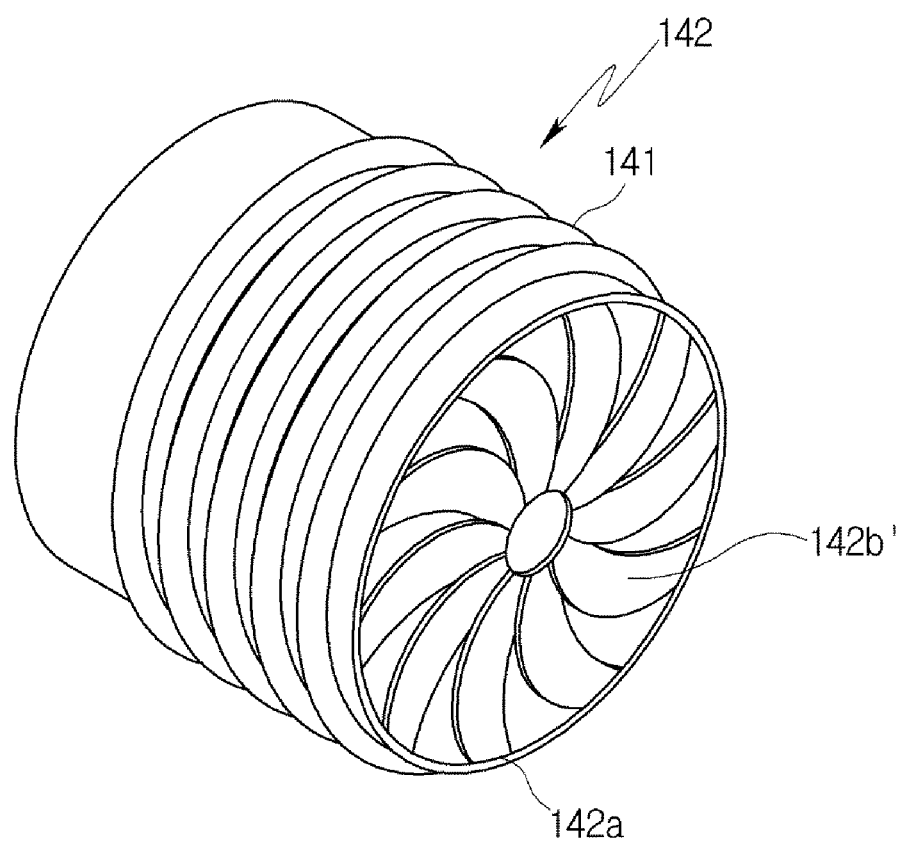
FIG. 6 is an exemplary perspective view showing the urea solution mixer in the urea solution injection device of FIG. 2 according to an exemplary embodiment of the present disclosure.

Various forms of the mixer member 142 are shown in FIG. 6. The mixer member 142 shown in FIG. 6 may include a ring member 142a coupled to the opening of a first end of the connection member 141, and a urea dispersion member 142b' composed of a plurality of curved fin members whose first ends are mutually coupled at the center of the ring member. The second ends are spaced apart from each other at a certain angle (e.g., a series of spokes of an umbrella) and coupled to the inner periphery of the ring member 142a. In other words, the urea solution dispersion member 142b' may be formed in a curved shape (e.g., a crescent shape) and the urea solution may be more effectively dispersed.

Figure 7:
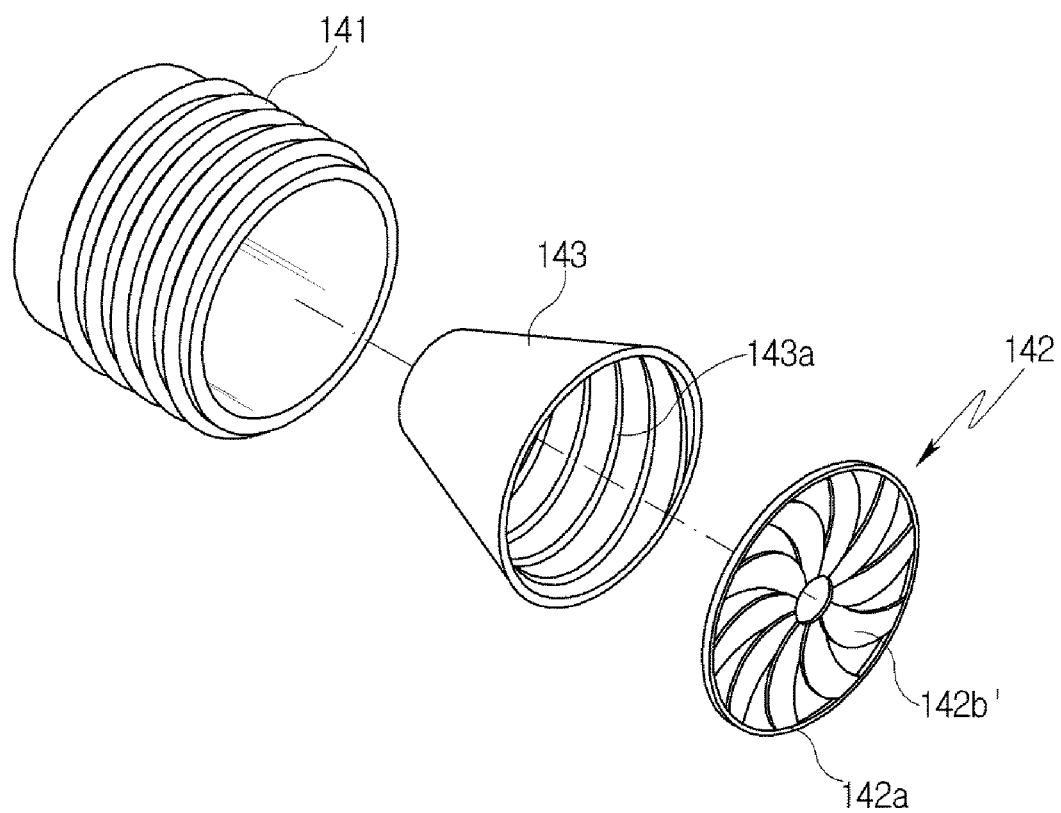
FIG. 7 is an exemplary exploded perspective view showing the urea solution mixer in the urea solution injection device of FIG. 2 according to an exemplary embodiment of the present disclosure.

FIGS. 5 and 7 illustrates exemplary embodiments in which the urea solution dispersion members 142b, 142b' may include a plurality of fin members having a flat plate shape. However, it is also possible to configure the plurality of fin members in a wing shape having a predetermined airfoil in order to further improve the effect of dispersing the urea solution.

As shown in FIG. 7, the urea solution mixer 140 may include a urea solution guide member 143 disposed within the connection member 141 and having a spiral portion 143a formed on its interior peripheral surface. For example, when the urea solution is guided from the injection portion of the injector 120, from which the urea solution is injected, to the urea solution dispersion member 142b' of the mixer member 142, the urea solution being injected may be injected and dispersed in a form of swirl. The urea solution guide member 143 may be formed substantially in a peaked hat shape with both ends opened and may be include an interior diameter that gradually increases from the injection portion of the injector 120 to the mixer member 142 side.

The spiral portion 143a of the urea solution guide member 143 may be formed in the form of a groove or a projection when being injected to the exterior, For example, when the urea solution is injected the exterior the urea solution may be dispersed in a swirl shape. In other words, a vortex component may be generated in the urea solution injected through the urea solution guide member 143 and the effect of dispersing the urea solution may be improved by the urea solution dispersion member 142b. Accordingly, the exemplary embodiment has an advantageous effect in that it is possible to replace the constitution of the conventional mixer which obstructs the exhaust pipe.

The installation unit 150 may be intended to install the urea solution mixer 140 coupled to the lower portion of the injector 120 in the exhaust pipe 110 and may pierce into the exhaust pipe and may include a first engagement portion 151, a support protrusion 152 and a second engagement portion 153. The first engagement portion 151 may include a thread formed on the exterior peripheral surface of the lower end of the urea solution mixer 140.

The support protrusion 152 may be formed to protrude higher than the exterior peripheral surface of the exhaust pipe 110. Additionally, the support protrusion may be formed in a pipe shape having the lower end of the urea solution mixer 140 fitted thereto. The support protrusion 152 may firmly support the urea solution mixer 140 pierced into and installed in the exhaust pipe 110. The support protrusion 152 may be configured to be disposed vertically or incline at a predetermined slope with respect to the exterior peripheral surface of the exhaust pipe 110. The support projection 152 may have the lower end welded and fixed to the exterior peripheral surface of the exhaust pipe 110. The second engagement portion 153 may include a thread which formed on the interior peripheral surface of the support projection 152 and may be coupled (e.g., screwed) to the exterior peripheral surface of the urea solution mixer 140 to be disposed into the interior peripheral surface of the support protrusion 152.

Further, the installation unit 150 may include the support protrusion 152 formed to protrude from the exterior peripheral surface of the exhaust pipe 110 and communicate with the interior of the exhaust pipe 110, and a clamp (now shown) that applies a force to the exterior peripheral surface of the support protrusion 152 after the lower end of the urea solution mixer 140 is fitted into the interior peripheral surface of the support protrusion 152. The clamp may be configured to wrap and rigidly tighten the exterior periphery of the support protrusion 152 after the end of the urea solution mixer 140 is fitted into the support protrusion 152.

The installation unit 150 may include the support protrusion 152 that communicates with the interior of the exhaust pipe 110 and may be formed on the exterior periphery of the exhaust pipe 110 and then the lower end of the urea solution mixer 140 may be fitted into the exterior peripheral surface of the support protrusion 152 and the components may be welded and fixed together.

Operation of the urea solution injection device according to an exemplary embodiment of the present disclosure will now be described briefly. First, upon forming exhaust pipe 110, an aperture for fixing the support protrusion 152 to the exhaust pipe 110 may be formed to communicate with the support protrusion 152 for coupling the urea solution mixer 140. Then, a tubular support protrusion 152 that may be coupled to the urea solution mixer 140 is formed. Then the second engagement portion 153, i.e., a thread for screwing the urea solution mixer 140 into the inner peripheral surface of the support protrusion 152 may be formed. Thereafter, the support protrusion 152 may be inserted into the aperture formed on the exhaust pipe 110 and then the components may be welded and fixed together to enable the interior of the exhaust pipe 110 and the interior of the support projection 152 to communicate with each other. The urea solution mixer 140 may be coupled to the lower end of a urea solution injection portion of the injector 120. In other words, the urea solution mixer 140 may be fixed to the exterior peripheral surface of the lower end of the injector 120 by screwing or welding.

As mentioned above, the urea solution mixer 140 coupled to the lower end of the injector 120 may be coupled to the interior peripheral surface of the support protrusion 152 provided on the exhaust pipe 110 by screwing or welding. The urea solution injection device according to an exemplary embodiment of the present disclosure may reduce back pressure by improving flow of exhaust gas through coupling to the injector 120 the urea solution mixer 140 for dispersing the urea solution into the exhaust gas flowing in an exhaust pipe 110. Accordingly, the urea solution may be more uniformly mixed with the exhaust gas.

Although the present disclosure has been described with reference to exemplary shown in the accompanying drawings, it is to be understood that the description is given by way of example only. It will be appreciated by those skilled in the art that various changes and equivalent alternative exemplary embodiments may be made without departing from the scope of the present disclosure. Accordingly, the true scope of the present disclosure should be determined by the following claims.

What is claimed is:

1. A urea solution injection device comprising:
   an exhaust pipe for discharging exhaust gas generated in a combustion chamber to an exterior;
   an injector disposed in the exhaust pipe that pierces the exhaust pipe to inject urea solution into the exhaust gas flowing in the exhaust pipe;
   a catalyst disposed at a position after the injector when viewed in a flow direction of the exhaust gas to decompose the exhaust gas mixed with the urea solution; and
   a urea solution mixer disposed at a first end of the injector and installed within the exhaust pipe and pierces the exhaust pipe to inject and disperse the urea solution from the injector,
   wherein the urea solution mixer comprises a connection member formed in a pipe shape, of which both ends are opened and a first end is inserted around an outer peripheral surface of a lower end of the injector, and a mixer member coupled to a second end of the connection member to scatter the urea solution injected from the injector,
   wherein the mixer member comprises a ring member inserted around and coupled to an edge of an opening at the second end of the connection member and having an aperture formed at a center thereof, and a urea solution dispersion member composed of a plurality of fin members, wherein each of the fin members being arranged to form a fan shape with its adjacent fin member in a manner that a first end of the fin members are adjacent to the center of the aperture and a second end of the fin members are spaced apart from each other at an interval of a predetermined angle and adjacent to an edge of the aperture having a plurality of dispersion apertures for dispersing the urea solution, and
   wherein the urea solution mixer further comprises a urea solution guide member coupled to an interior of the connection member to guide the urea solution injected from the injector to the urea solution dispersion member, wherein an interior peripheral surface of the urea solution guide member has a groove of a projection-shaped spiral portion that guides the urea solution injected from the injector in a shape of swirl.

2. The urea solution injection device according to claim 1, wherein the urea solution dispersion member has the plurality of fin members formed in a curved shape.

3. The urea solution injection device according to claim 1, further comprising:
   an installation unit for allowing the urea solution mixer to be disposed within and piercing into the exhaust pipe the installation unit comprising:
   a first engagement portion formed on an exterior peripheral surface of the urea solution mixer;
   a support protrusion that protrudes from an exterior peripheral surface of the exhaust pipe to communicate with an interior of the exhaust pipe; and
   a second engagement portion disposed on an interior peripheral surface of the support protrusion to engage with the first engagement portion of the urea solution mixer.

4. The urea solution injection device according to claim 3, wherein the first engagement portion and the second engagement portion include threads that are screwed to each other.

\* \* \* \* \*